(12) United States Patent
Keppe et al.

(10) Patent No.: US 8,546,985 B2
(45) Date of Patent: Oct. 1, 2013

(54) ELECTROMAGNETIC MOTOR AND EQUIPMENT TO GENERATE WORK TORQUE

(75) Inventors: Norberto da Rocha Keppe, São Paulo (BR); Carlos César Soós, São Paulo (BR); Roberto Heitor Frascari, São Paulo (BR)

(73) Assignee: Associacao Keppe & Pacheco (BR)

( * ) Notice: Subject to any disclaimer, the term of this patent is extended or adjusted under 35 U.S.C. 154(b) by 249 days.

(21) Appl. No.: 12/992,251

(22) PCT Filed: May 21, 2009

(86) PCT No.: PCT/BR2009/000143
§ 371 (c)(1),
(2), (4) Date: Jul. 28, 2011

(87) PCT Pub. No.: WO2009/140750
PCT Pub. Date: Nov. 26, 2009

(65) Prior Publication Data
US 2011/0298326 A1 Dec. 8, 2011

(30) Foreign Application Priority Data

May 23, 2008 (BR) .............................. PI0802090-6
Oct. 3, 2008 (BR) ................. PCT/BR2008/000301

(51) Int. Cl.
*H02K 11/00* (2006.01)
(52) U.S. Cl.
USPC .......................................... 310/69; 310/68 C

(58) Field of Classification Search
USPC ................................ 310/69, 68 C, 68 E, 68 R
See application file for complete search history.

(56) References Cited

U.S. PATENT DOCUMENTS

| 4,064,442 | A |   | 12/1977 | Garron |   |
|---|---|---|---|---|---|
| 4,857,783 | A |   | 8/1989 | Prunkard |   |
| 5,227,702 | A | * | 7/1993 | Nahirney | 318/400.41 |
| 7,034,498 | B2 | * | 4/2006 | Kerlin | 318/400.36 |

FOREIGN PATENT DOCUMENTS

WO    WO-2007/029905 A2 *    3/2007

OTHER PUBLICATIONS

"International Application No. PCT/BR2009/000143, International Search Report mailed Sep. 30, 2010", 4 pgs.
International Application No. PCT/BR2009/000143, Written Opinion mailed Sep. 30, 2010, 2 pgs.

* cited by examiner

*Primary Examiner* — Nguyen N Hanh
(74) *Attorney, Agent, or Firm* — Schwegman, Lundberg & Woessner, P.A.

(57) ABSTRACT

The present invention refers to a high efficiency and cold electromagnetic motor that is able to considerably increase the electromagnetic and/or mechanic potential energy available to be used in any equipment fed by primary sources of energy. More specifically, the present invention refers to a motor, or also a generator, that comprises structural and functioning features that reduce the consumption of electric energy and, at the same time, deliver mechanic potential energy and work torque at least equivalent to the conventional electric motors.

23 Claims, 7 Drawing Sheets

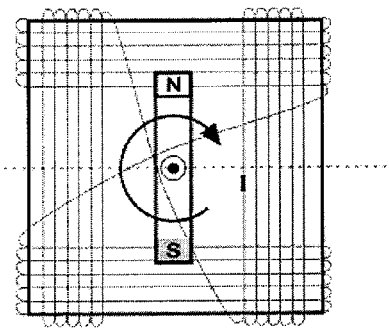 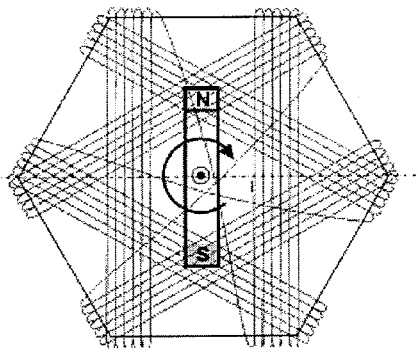
Fig. 8A  Fig. 8B
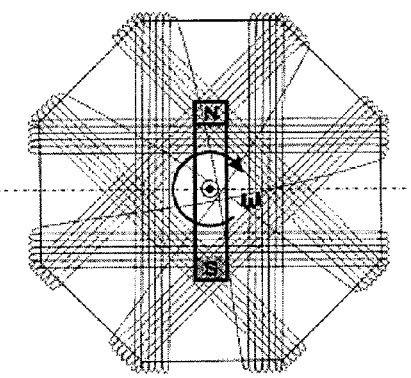
Fig. 8C
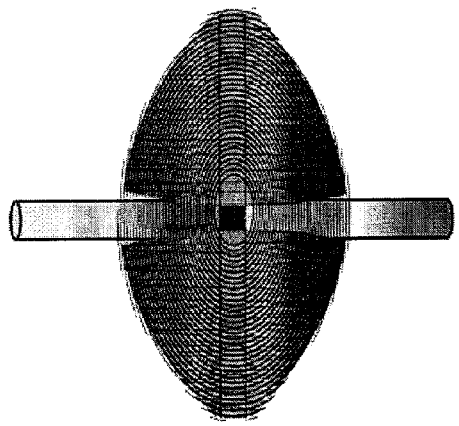 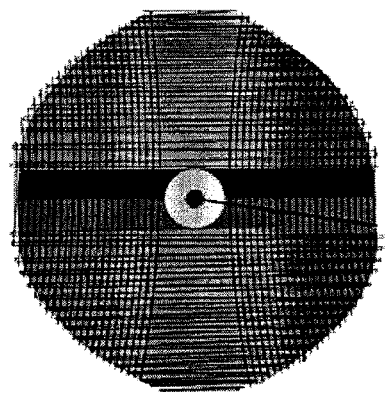
Fig. 8D  Fig. 8E

ELECTROMAGNETIC MOTOR AND EQUIPMENT TO GENERATE WORK TORQUE

REFERENCE TO CORRELATED APPLICATION

This application is a nationalization under 35 U.S.C. 371 of PCT/BR2009/000143, filed May 21, 2009 and published as WO 2009/140750 A2 on Nov. 26, 2009, which claimed priority under 35 U.S.C. 119 to Brazilian Patent Application No. PI 0802090-6, filed May 23, 2008 and International Patent Application PCT/BR2008/000301, filed Oct. 3, 2008; which applications and publication are incorporated herein by reference in their entirety.

FIELD OF INVENTION

The present invention refers to a cold and high efficiency electromagnetic motor capable of increasing considerably the electromagnetic and/or mechanical potential energy available to be used in all equipment supplied with energy in a primary forms. More specifically, the invention refers to a motor, or even a generator, which comprises structure and functioning characteristics that reduce the consumption of electrical energy and, at the same time, produces equivalent and even superior mechanical potential and torque in relation to conventional motors.

In addition, the motor, object of the present invention has a more simplified structure that can be applied to any electrical device, specially those called electrical receptors, designed to produce, at least, the same power efficiency, but consuming less energy, without risks of overheating the equipment and, yet, reducing manufacture costs of the said devices.

Besides, the electromagnetic motor of the present invention solves a number of today's problems related to the use of conventional energy sources and the scarceness of electric energy, for it has the ability to deliver the same power, consuming less energy.

BACKGROUND OF THE INVENTION

Many types of electromagnetic motors are known today, and they are designed to deliver mechanical power—torque, from the interaction of magnetic components of a closed circuit supplied with electric current. All these motors known in the prior art are developed according to scientific principles, laws and theories pertaining to traditional physics and electricity, and considered universal, natural and inflexible laws, i.e., immutable. Nevertheless, scientific theories are limited to the understanding of the scientists who elaborated them, for example: Newton's laws, Ohm's laws, laws of thermodynamic, etc.

Therefore, it must be clear that a different perspective of the conventional scientific philosophy can lead to a new understanding of physics and an upgraded technology, which is able to give a practical solution to problems which are, so far, considered as intrinsic factors to a specific physical process.

In this context, it is worth to mention that the machines have basically, as a principle, the consumption and transformation of a certain type of energy in, basically energy considered as loss, usually heat, inherent to its functioning and, in the availability of any other type of energy that is considered useful to the aimed finality.

Thus, it is also known that electric motors are defined as machines that are powered by energy in its electric form supplied by a power source, i.e., the mains power supply with alternating current (single-phase, bi-phase, three-phase) or batteries and solar cells with direct current. in such a way that the referred electric energy is transformed in energy in its heat form, denominated as a loss provoked by attrition, magnetic drag, hysteresis, eddy currents, joule effects, etc., and finally by the energy supply in its mechanical form, useful and available for work that is related to the torque and rotation of the motor shaft.

Conversely, it is also known that electric generators are powered by some type of primary energy, as for example, chemical combustion (diesel, gasoline, gas, alcohol, etc) or mechanical (hydraulic power, wind power, etc.), and transform in losses in the form of heat and electric current in the output to feed other equipment.

Thus, in machines of such a nature, its yield or efficiency is calculated by the ratio between the output and the input. Merely as an illustration, if a motor consumes 60 W of the mains power supply and produces 30 W of mechanical work, its efficiency is given by the ratio 30 W/60 W, that corresponds to 0.5 or expressed in percentage, 50%.

The same way, the generator that is powered by 1 KW of mechanical power that can be supplied by a waterfall with constant "Q" flow in $m^3/s$, from a "h" height and that generates 850 W of electric energy in the output will have an efficiency of 850 W/1.000 W, that corresponds to an efficiency of 0.85, or in percentage, 85%.

In this context, there are many types of electric motors, however the electromagnetic motors which are currently the most used due to its easy construction are known as induction motors that, however, have a squirrel-cage type rotor or a coil rotor.

In general, the cage rotor induction motors comprise a cylinder rotor made of metal (aluminum, for example)—or shorted out coils mounted on the said metallic cylinder, surrounded by electromagnets which are fed with electric AC current to generate a first variable magnetic field, so as to obtain electromagnetic induction. The magnetic field produces a current on the surface of the metallic cylinder (or shorted out coils), which, in turn, produces its own magnetic field. These two magnetic fields (from the rotor and the stator) interact, by pulling and pushing each other, causing the cylinder to rotate and, consequently, deliver the mechanical power to the rotor shaft.

The electric motors with rotor coils comprise a number of copper wire coils mounted both on a metallic cylinder rotor and a stator, through which, usually flows an alternating electric current (AC), generating magnetic fields that attract and repel each other the variable fields of the rotor. Due to the polarity alternation of the magnetic field in synchronicity, the rotor spins and delivers mechanical power.

According to the prior art the electromagnetic motors are usually based on two phenomena, as follows: 1) when we apply electric current through a conducting wire, the magnetic field is generated by the conducting material; and 2) if a conducting wire is exposed to a variable magnetic field, it will present an electric potential difference in both of its ends, and the electric current generated inside the conductor forms, in turn, a magnetic field which opposes to the external field that caused it.

In addition to that, the electric motors of the prior art are constantly fed with electricity, in order to generate the polarity alternation of the magnetic components intending to obtain the attraction/repulsion effect. Obviously, this process, in order to keep the rotor spinning under load (torque applied to the shaft), requires high energy consumption. As consequence, heat losses are inevitable, i.e., with the so-called losses or transformation in heat energy.

Thus, in view of the foregoing, particularly due to the action-reaction interactions, it is possible to note that the prior art electromagnetic motors considering that the intrinsic heat losses are impossible to be avoided. In other words, the alternating magnetic fields produced by the passage of alternating electric current through the stator and rotor coils of the motors cause them to heat up in the same proportion to the intensity and variation rate of these fields.

Because of that, when an electric motor is fed by any kind of power source—either battery or AC power public grid—the simple free-load spin of the shaft involves some mechanical torque, which reacts to the electric power supply circuit and represents a line voltage drop, against the feeding energy of the motor, tending to stop it. This voltage drop is technically known as counter electromotive force (back emf).

Nevertheless, to each mechanical load added to the line of the motor, the extra electric power required to overcome it will represent an increase in the back emf, i.e., a resistance increase, in such a way that the feeding source supply more power in order to overcome the load resistance. As consequence to that, the temperature of the windings rises and causes the efficiency of the motor to drop. In case the mechanical load is too high and exceeds its project limit value, overheating takes place and the motor burns.

In this sense, again it is observed that the continuous supply of electricity (AC or DC) to the conventional motors involves a series of problems, especially those related to the overheating and performance drop.

According to the scientific theories utilized to develop these electromagnetic motors, four intrinsic and opposing forces to the movement of the motor are considered, as follows: counter electromotive force, magnetic drag, hysteresis and eddy currents. All of these resistive forces result in heating and possible burning of the motors when they are subjected to heavy loads, for they demand continuous electric supply from the power source.

After the above explanations, the inventors claim, in spite of acknowledging the theoretical concepts known today, and complement that the same are incomplete, because they ignore the essential physical characteristics of the magnetic matter and/or electric conductive matter in regard to its function of capturing energy from the environment, as well as the structure of the electromagnetic fields, the concepts of voltage and electric current and their deficiencies.

Taking into consideration that the motors of the state of the art are said to have these resistive forces as intrinsic to their functioning, today's projects are oversized and their electric consumption is more elevated than they should, which contributes to cause negative impact over the environment.

As technicians in the field are aware, one of the main problems in the world today is the scarceness of natural resources for power generation, besides the quantity of pollutants discharged to the atmosphere caused by the burning of fossil fuels.

In order to briefly clarify the bases of the invention, according to the theories and concepts researched and developed by Keppe (refer to "The New Physics Derived From A Disinverted Metaphysics", Keppe, Norberto da Rocha, published 1996, Proton Publishing House, Paris) the present invention is based on the hypothesis that matter captures and transforms immaterial energy, called essential energy, into secondary forms of energy, namely electricity and magnetism.

Summarizing, besides other concepts explored by Keppe, the author holds that the essential energy, in the case of the magnetic fields, is twofold and bidirectional, i.e., it always acts in two components, but in opposite and complimentary directions.

More specifically, what we know as voltage according to traditional concepts, for Keppe, means essential energy itself, so that when electric current flows through a conducting wire, caused by an electric potential difference between its terminals, in fact, just one component of the essential energy is in use, ignoring the power and capacity of the second component of the essential energy. As consequence to that, because this second component is totally discarded, the motors of the current prior art present inconveniences related to heat loss.

In other words, the electromagnetic motors of the present state of the art utilize the energy generated by the magnetic field during the electric current input, ignoring or discarding the second component of the essential energy, i.e., the back energy, expressed by transients in the line, direct and reverse peaks, at the moment of the building up and collapsing of the magnetic field of the motor coils.

BRIEF DESCRIPTION OF THE INVENTION

Therefore, intending to overcome deficiencies and solve the problems hereinbefore mentioned in relation to the electric motors of the prior art, the electromagnetic motor, object of the present invention, was developed.

More specifically, it is the objective of the present invention an electromagnetic motor that can replace any other motor powered by primary forms of energy such as electric, electromagnetic, mechanic, nuclear, piezoelectric, sonic, thermal, luminous, hydraulic, pneumatic, chemical, electromagnetic induction, combustion of fossil fuels, biofuels, etc., preferably those designed to deliver torque.

Yet, another objective of the invention is an electromagnetic motor with technical and functional characteristics that can overcome, or even eliminate in specific cases, the resistive forces acting against the movement of the rotor through the application of the concepts developed by Keppe.

Yet, the present invention has the objective of an electromagnetic motor which, besides utilizing the energy generated by the electric current flow inside the wires of a coil, captures and uses the essential energy in its complete form, i.e., a motor designed to capture and use the two components, action and complementation, according to Keppe, of the essential energy trapped in the magnetic fields.

In this way, it is the objective of the invention an electromagnetic motor that does not heat up and makes it possible for the manufacture of wireless versions of many electric household appliances which are traded only with wires and currently designed be plugged to 110/220V domestic electric outlets, like for example, fans, vacuum cleaners, mixers and many other low power home appliances.

It is also object of the invention an electromagnetic motor that enhances the useful life of conventional batteries used in wireless devices and power tools, without reducing their mechanical power.

Yet, the electromagnetic motor of the invention is more efficient, which reduces considerably the manufacturing costs of electric equipment that embodies motors, for it is possible to reduce their size and, consequently use less material to manufacture them.

Additionally, it is the objective of the invention a motor that can be adapted to work as a power generator, small or big, and help save energy in electric power plants based on primary driving energies such as radioactive material, water potential, wind potential, sun, coal etc.

Besides, it is the scope of the present invention a motor that can be used in its generator mode in order to recuperate the electromagnetic energy accumulated in the coil(s) and send it back to the coil(s), generating a second power source independently from the first source, which can be a battery, the mains power supply or any other.

Most precisely, this alternative performance of the motor in the present invention can be denominated as an electromagnetic feedback system or electromagnetic turbo system, which comprises the coupling of one or more capacitors in the output of one or more coils of the basic embodiment of the motor object of this invention.

The electromagnetic motor according to the invention can, still, be adapted to replace hybrid (fuel/electricity) motors currently developed for the car, nautical and aircraft industry, for its capacity and work potential are considerably superior to those of the conventional motors, in addition to consuming less electric energy as well as it allows the generation of feedback energy.

In order to achieve the above indicated objectives, the electromagnetic motor of the present invention is equipped to use the essential energy in its integrality, particularly its second component, here called back component, back peak or back energy, which is obtained both 1) through the collapse of the magnetic field caused by draining off the energy trapped inside the stator coils when the electric current input ceases and 2) the high voltage peaks caused by switching on and off the input current to the coils.

More specifically, the electromagnetic motor of the present invention works with electric direct current pulses provided by a power supply in closed circuit that feeds the wires of stator coils, inside which there is a magnetic rotor, coiled and made of permanent magnets. The pulses are controlled by means of sensors duly positioned so as to determine the exact instant of the pulses, making possible the capturing and harnessing of the said back energy. In the alternative construction, capacitors can be added to the motor line so that its work resonance can be achieved.

More specifically the increase of work power in the motor-generator proposed in the alternative construction of the present invention is obtained when the motor initiates its movement through the primary mains power supply (rectified current) or through one or more batteries, that power, respectively the motor coil(s) through a pulse of energy that interact, on its (their) turn, with one or more magnetic or electromagnetic rotors fixed in the rotation shaft, resulting in the rotation of said shaft.

In this sense, the alternating current generated in the terminals of said coil(s) that involves one or more rotating magnetic or electromagnetic rotors is rectified, in a half wave or complete wave and deviated to one or more capacitors, or even to a capacitor bank, that on their turn are able to accumulate a voltage superior to the input primary power voltage of the first motor pulse. This amplified voltage in the capacitor (s) is used as a second direct current power source, being completely independent from the primary power source and corresponding to the power (electricity) generator aspect of the present invention. The capacitor(s) positive and negative outputs are dully connected to the motor coil terminals that supply sufficient current and electric charge to power one or more extra pulses in the coil(s) when the rotor is in the appropriate phases in relation to them, in order to contribute to the rotation of the rotor.

Finally, by coupling one or more motors/generators in the same shaft, with two coils duly connected in a series or in parallel, one in able to increase indefinitely the gain of energy produced by the generator aspect of the present construction in relation to the energy consumed by the motor aspect of the present construction. In other words, with the proposed feedback, the efficiency of the present motor is not limited anymore to only 100%.

BRIEF DESCRIPTION OF THE FIGURES

The objectives and technical effects attained by the electromagnetic motor and generator, object of the present invention, shall be clear to technicians of the field, starting with the following detailed description referring to the enclosed drawings, in which:

FIGS. 8A, 8B, 8C 8D and 8E illustrate alternative embodiments for the electromagnetic motor according to the invention.

DETAILED DESCRIPTION OF THE INVENTION

The electromagnetic motor, object of the present invention comprises a structure that can use the essential energy in its integrality. Besides the energy generated to power the stator coil during the electric current input, it also captures and uses the back energy derived from the collapse of the magnetic field when the energy supply is switched off and the magnetic energy of the said stator coil is drained off.

More precisely, the electromagnetic motor of the present invention comprises simple structure features which were developed according to principles outlined by Norberto da Rocha Keppe, in the book mentioned above.

The present invention has for objective an electromagnetic motor that generates work and mechanical torque with potential, at least equivalent to the conventional motors of the prior art, but consuming less electric energy, since the electric power supply is not constant, and yet it can promote the feedback of the motor.

Figure 1:
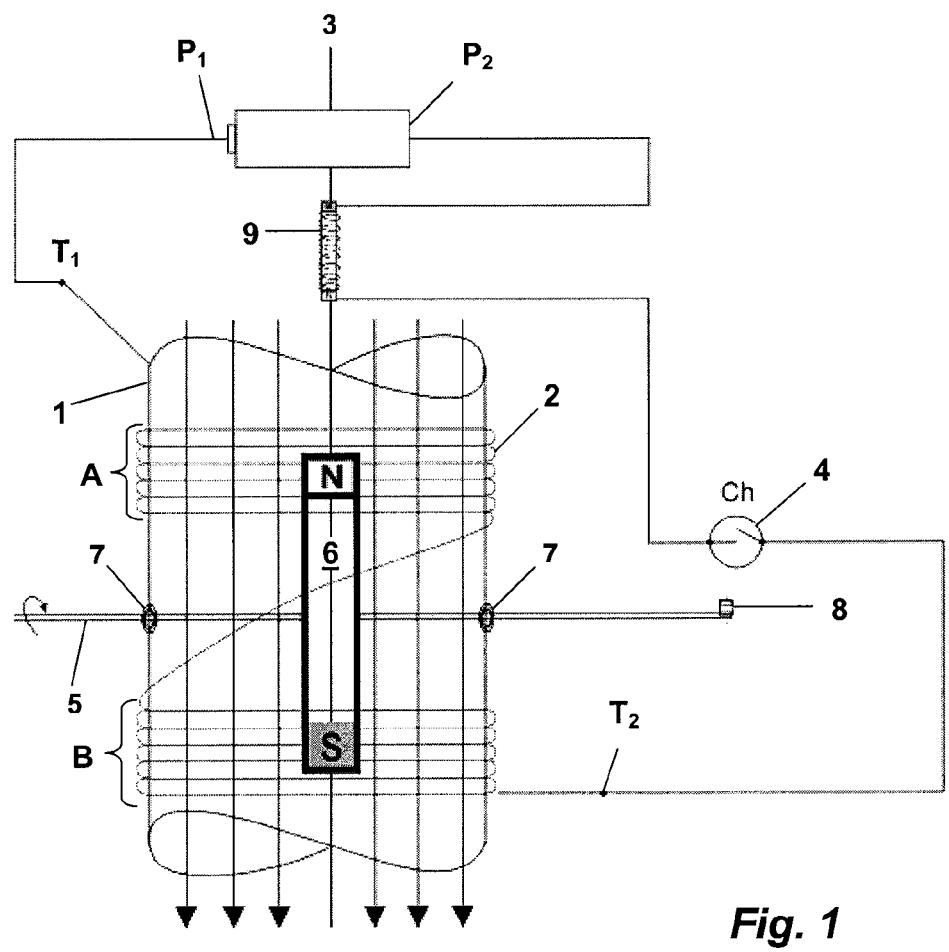
FIG. 1 illustrates the basic embodiment of the electromagnetic motor according to the present invention.

More preferably, in the first embodiment of the invention, the electromagnetic motor shown in FIG. 1 is comprised of a stator 1 constituted by a coil 2 made with conducting wires whose terminals T1 and T2 are respectively connected to the positive P1 and negative P2 poles of a power supply 3, so that between the terminal T2 and the negative pole P2 there is a on/off key 4, or switch properly positioned on the side and close to the end of the shaft 5 of the magnetic rotor 6.

The said shaft 5 is positioned at the center and forming a right angle with the body of the stator 1, through the bearings 7, so that inside the body of the said stator 1, the shaft 5 supports the rotor 6, which is comprised of at least one permanent magnet.

Preferably, the coil 2 is formed by the windings of a conducting wire, such as copper or aluminum, in two sectors with preferably the same number of turns and axially or radially positioned apart from one another. FIG. 1 shows the said sectors A and B connected to each other and winded apart around the stator body 1.

The number of turns of each sector A and B of the coil 2 is set according to the specifications of the motor design in order to reach the resonance of the rotor/coil(s) pair, depending on the characteristics and power desired.

Yet, according to the attached drawings and a specific design of the invention, the electromagnetic motor is powered by pulses of DC current (from batteries or rectified AC current) with duration times depending on the design. This arrangement is different from the electromagnetic motors of the prior art that use the alternation of AC sinusoidal signals to produce the magnetic field (AC motors), or inversion of the direct current during the rotor cycle (DC motors) in order to obtain the magnetic fields and, consequently the incompatibility of the magnetic polarities to generate the movement of the rotor shaft.

In addition, in one end of the shaft 5, outside the stator body 1, an actuator 8 is properly positioned to turn on and off the on/off key 4 or switch when the shaft 5 rotates. Preferably, the said actuator 8 is a permanent magnet whose magnetic field lies at right angle to the rotation shaft 5, and the said on/off switch 4 is a reed-type switch that responds to the presence of the said magnetic field. The actuator 8 can be replaced to suit other switches 4 like Hall sensors, optic sensors or even discarded in the case of PWM pulsating circuits.

Thus, when the shaft 5 of the rotor 6 rotates, the said actuator 8 turns on the switch 4, opening and closing the electric circuit of the electromagnetic motor of the invention, so as to provide electric direct current pulses to power the stator coil.

Alternatively, one electromagnet 9 can be properly positioned in order to determine the supply pulses of the electric power, making that the pulses be generated in the exact position of rotor 6 pushing it yet more in its movement.

The said electromagnet 9 is preferably made of a laminated silicon steel core enveloped by a number of turns of conducting wire which generates a magnetic field to help the incompatibility between the polarities and the magnetic poles of the rotor 6, thus causing them to repel one another.

Figure 2C:
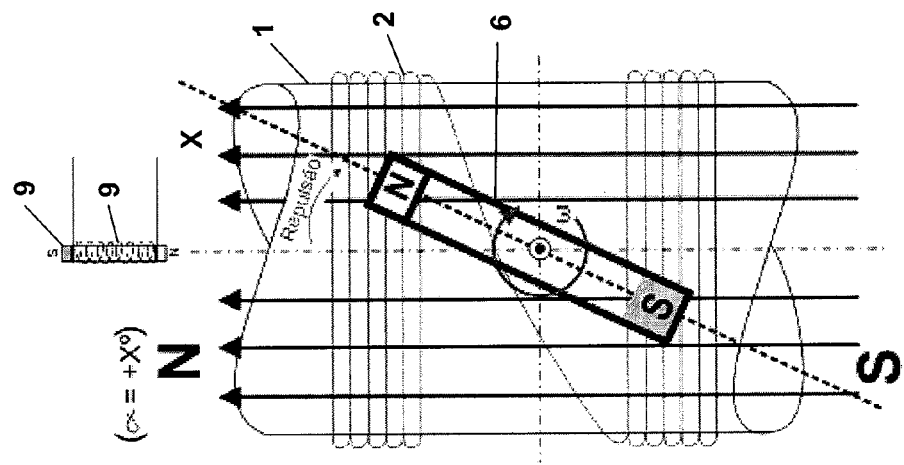
FIGS. 2A, 2B and 2C illustrate the movement sequence of the rotor of the electromagnetic motor in accordance with the invention.
Figure 2B:
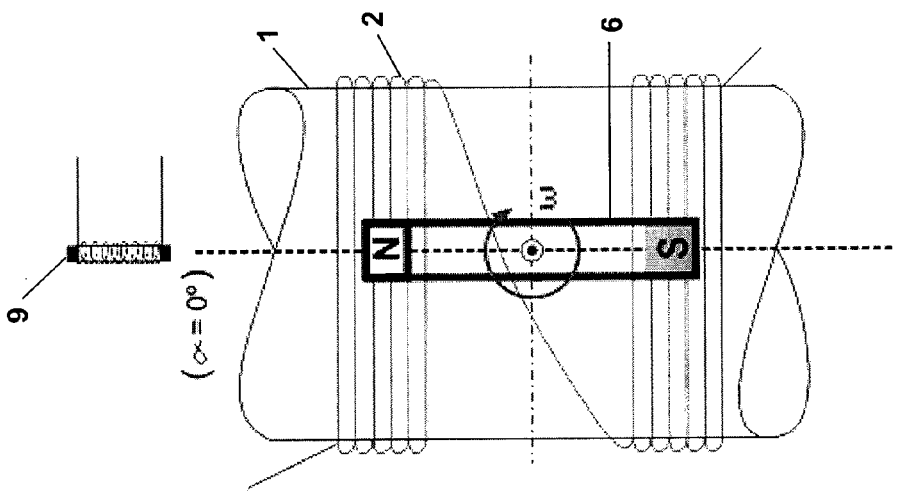
Figure 2A:
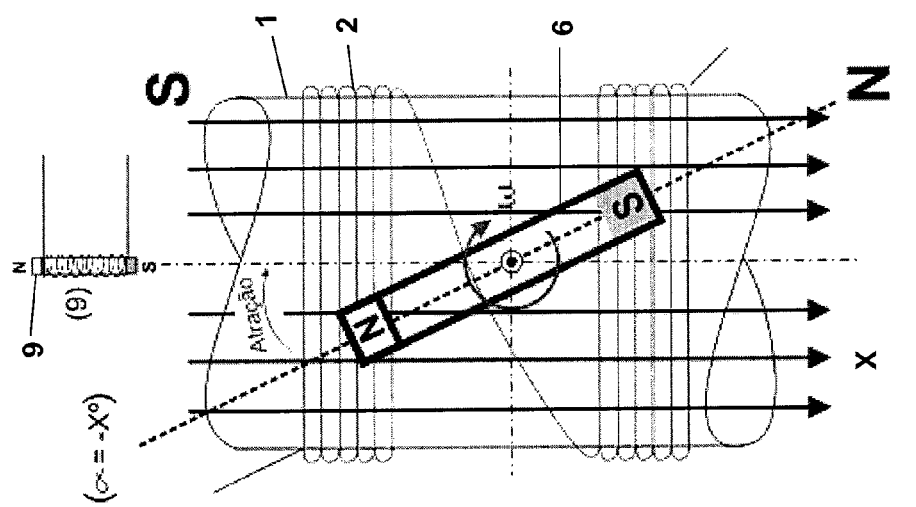

More specifically in relation to the sequence of drawings shown in FIGS. 2A, 2B and 2C, the electromagnetic motor of the invention works in the following way: the actuator 8, attached to the end of the shaft 5 of the rotor 6 is positioned and adjusted so that its magnetic field, when closing the on/off switch 4, is at a precise point where the angle of the shaft of the rotor 6, in relation to the magnetic field lines of the stator coil, is $\alpha=-X°$, as shown in FIG. 2A. In this exact position, the magnet of the rotor 6 starts its cycle of attraction, tending to its neutral point, where $\alpha=0°$ in relation to the magnetic field lines of the stator coil, to immediately afterwards enter the drag region, whose tendency is to stop it due to the polarity of the magnetic field generated by the coil 2 and the polarity of the rotor 6.

At the moment the rotor 6 reaches its neutral point, i.e., where $\alpha=0°$, as indicated in FIG. 2B and is ready to enter the drag region, the on/off switch 4 is switched off.

At this moment when the on/off switch 4 is off, the force of the magnetic drag ceases. Nevertheless, immediately after this neutral point, where $\alpha=+X°$, indicated in FIG. 2C, the opposing force or back energy caused by the collapse of the magnetic field inside the stator coil 2 acts upon the rotor 6, inverting the polarity of the magnetic field and forcing the rotor 6 to move away in the attempt to reach equilibrium or the neutral point of the movement of the rotor.

It must be clarified that such effect is a combined effect between the energy gained by the observed negative peaks of voltage (and current) provoked by turning on and off the switch 4, and the magnetic energy derived from the collapse of the magnetic field, which inverts polarity of the field trapped in the coil, thus exerting a force of repulsion upon the magnetic rotor 6. As indicated in FIGS. 2A and 2C the representative lines X of magnetic field invert direction, provoking the polarity inversion of the magnetic field of the coil 2.

Thus, according to the construction described above, the electromagnetic motor of the present invention provokes two phenomena almost at the same time due to the short time interval between the electric current pulses generated. First, when the on/off switch 4 is turned on, the battery feeds the stator coil of the motor that builds up a magnetic field proportional to the supplied voltage, which attracts the magnet of the rotor to the position of equilibrium—immediately after that, the second phenomenon takes place, when the on/off switch 4 is turned off, causing the magnetic field of the coil to collapse, which is responsible for the generation of the back energy arising from the surrounding scalar field that corresponds to the complement of the first component of the essential energy trapped inside the coil and coming from the power source. One can easily verify that the voltage corresponding to this back energy is tenths times superior to the power supply voltage.

Besides this evident power gain due to the back energy (or complementary energy), the fact of pulsating DC current, preferably supplied by a battery, without phase alternation like in the case of AC current supply, gives the following results:

i) minimized counter electromotive force in the case of constant and low torque applications, for the magnetic rotor rotates freely along more than half the rotor cycle;

ii) minimized drag, for the magnetic field of the stator coil is turned off immediately after the rotor magnet 6 passes over the point of equilibrium, which lets it rotate freely until other pulses are applied at specific points;

iii) zero hysteresis, since the feeding current is a direct and pulsed current, so there is no polarity alternation of the source;

iv) minimized eddy currents, because, either there are no iron or laminated silicon steel cores in the stator coils and/or the magnetic fields created inside the coil 2—both during power supply and back energy supply are parallel to the body of the motor, thus yielding close-to-zero the induced currents.

Besides the reduction and/or elimination of hysteresis and eddy currents losses, the inventors remark that heat losses in the conductors caused by the Joule effect are also greatly minimized and consequently, there is no considerable temperature rise, which improves both efficiency and useful life of the motor (insulation), since there is no risk of overheating.

Besides this, as can noticed, during the functioning of the electromagnetic motor according to the invention, the power supply 3 is not constantly active, as it only inputs energy into the circuit when the pulses are given by the actuator 8 upon the on/off switch 4. As result, the consumption of the battery is greatly reduced when compared to the prior art motors, and this allows develop new battery-built-in for currently non-portable equipment, with higher efficiency and durability.

Thus, in short, the electromagnetic motor, object of the invention, is develop take in consideration the principle of capture and harness energy generated by the collapse of the magnetic field which takes place when the energy contained in the coil 2 is drained off. Such energy is responsible for the inversion of polarity of the magnetic field that acts upon the magnetic rotor.

Figure 3:
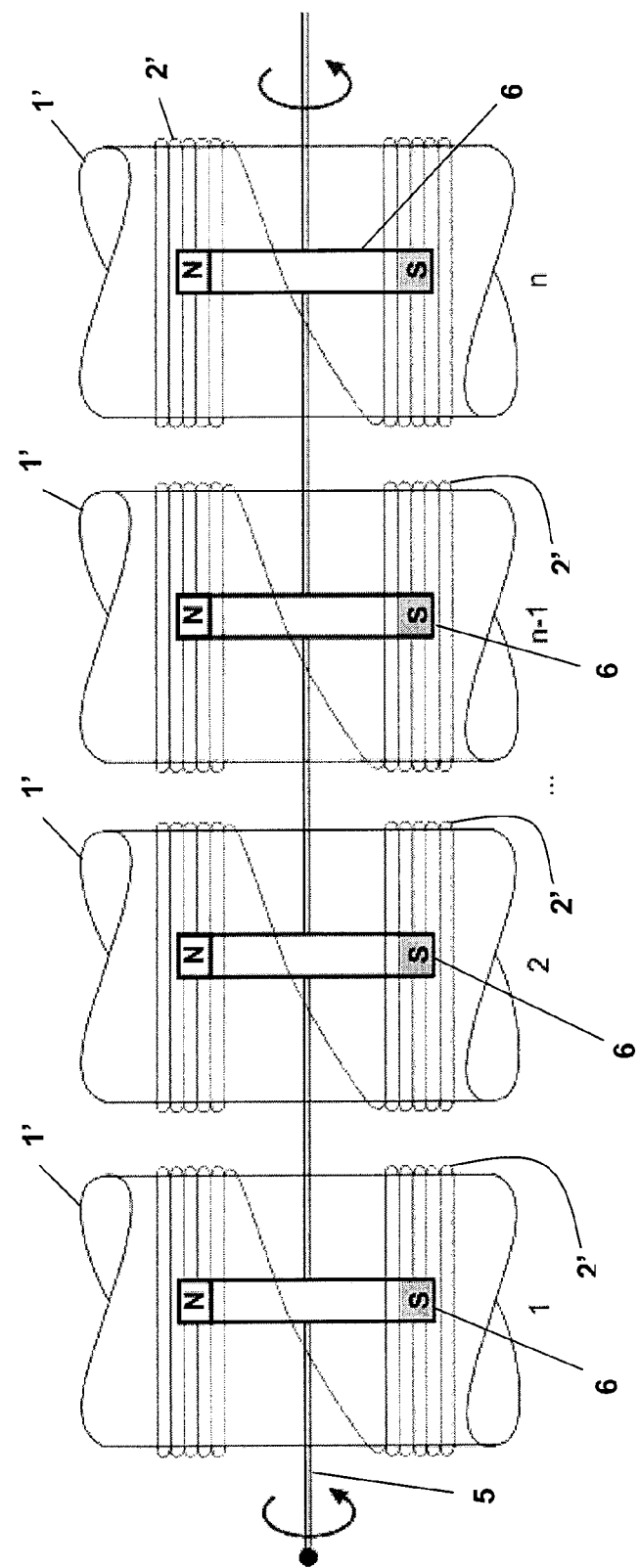
FIG. 3 illustrates an alternative embodiment of the electromagnetic motor of the invention.
Figure 4:
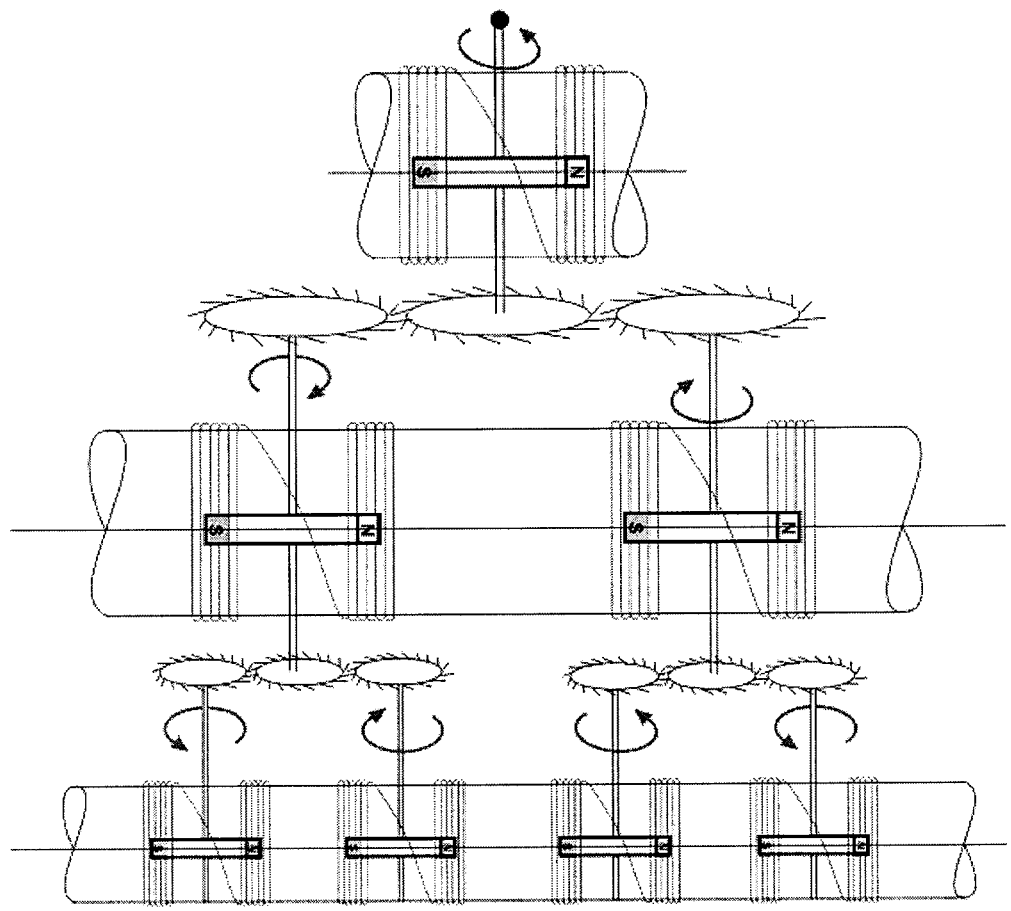
FIG. 4 illustrates other alternative embodiments that use electromagnetic motors according to the present invention.

The FIGS. 3 and 4 illustrate alternative embodiments comprising a series of electromagnetic motors according to the present invention. FIG. 3 shows the combination of a series of rotors 6' disposed side by side along the same shaft 5'. Each rotor 6' rests inside its own stator coil, so as to add torque to the shaft ends.

This embodiment is particularly used for power equipment with longitudinal bodies, because the association of individual torques in the same shaft adds. This combination can work with lower voltages than those used for conventional motors, and thus operate with batteries and reach high efficiency. In addition, the use of higher voltages increases torque considerably.

The FIG. 4 is a drawing of another combination of motors interconnected by means of gears 10, which depending on their rate, can increase or diminish torque (or speed) at the ends of the rotating shaft.

Through this alternative embodiment, the phenomenon of resonance causes the motors to interact with one another at distance, still increasing the efficiency of the mechanical system as a whole. In other words, besides the action of the coils upon the magnetic rotors, the entire system benefits from the resonance between the magnetic rotors. As a result, the torque and the consumption are optimized.

Figure 5:
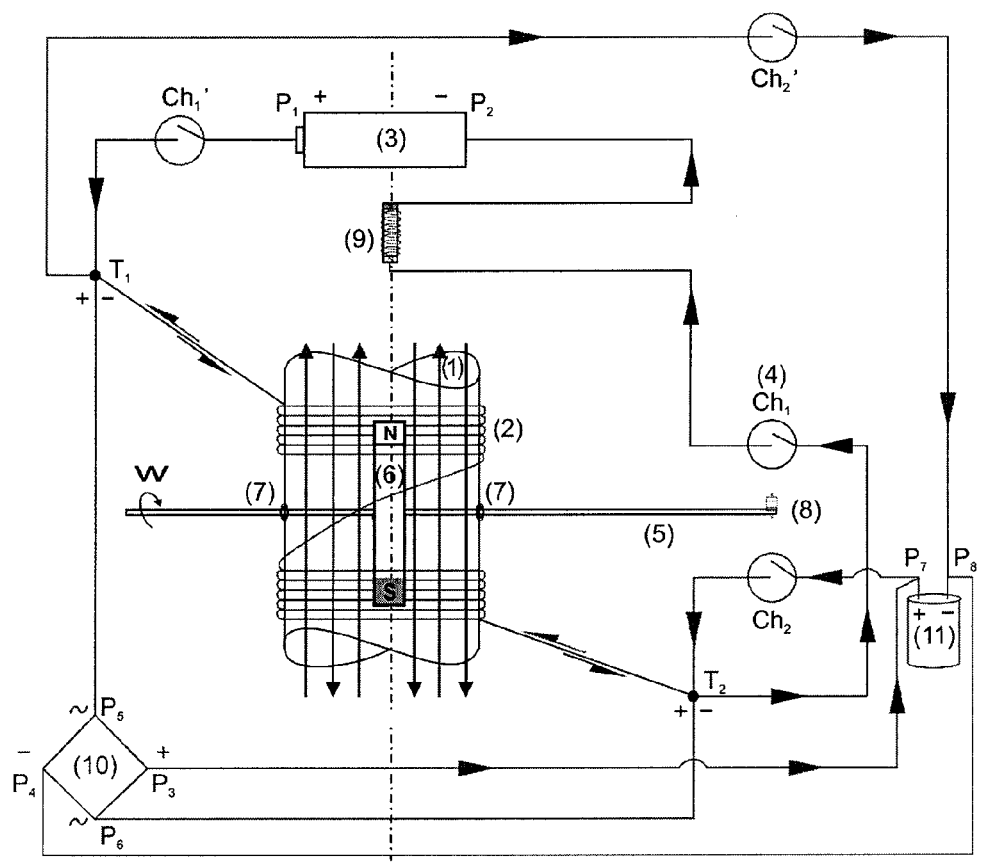
FIG. 5 illustrates an alternative embodiment t o the motor illustrated in FIG. 1 with a feedback system according to the present invention.

In an alternative embodiment of the present invention, as illustrated especially in FIG. 5, the motor of the present invention comprises a secondary circuit incorporated to the circuit of the motor illustrated in FIG. 1, being that its objective is to promote the feedback and increase the motor work power.

Most specifically, the feedback circuit is aimed at powering the stator coil(s) and/or eventually the rotors made by electromagnets so that the motor of the present invention can work as a mechanical power output amplifier. This circuit basically consists in the addition of a full wave rectifying bridge, one or more parallel capacitors and a synchronized switch system made by relays, transistors, mechanical switch or any other one.

The FIG. 5 constitutes a schematic representation of how the secondary circuit is interrelated to the original basic circuit indicated in FIG. 1. The circuit in black lines is the primary circuit, i.e., the one defined as basic original and similar to the one in FIG. 1, being powered by the external power source, battery or rectified mains power supply. The circuit in gray (or lighter) lines is the secondary feedback circuit by capacitive discharges, object of the present alternative embodiment.

As illustrated in FIG. 5, in addition to the one illustrated in FIG. 1, introduce firstly a second switch Ch1', disposed between the positive terminal P1 of the power source 3 and the positive terminal T1 of coil 2 of the primary circuit. The Ch1' switch is synchronized to the Ch1 4 switch, i.e., it shall be instantaneously switched in order to be always closed when the Ch1 4 switch is closed and it should be opened when the Ch1 4 switch is opened.

The secondary feedback circuit starts with the alternating current rectification generated by rotor 6 turning magnet in terminals T1 and T2 of coil 2. This alternating current is rectified from terminals P5 and P6 of the rectifying bridge 10, which supplies full wave direct current between the positive P3 and negative P4 terminals. These terminals are connected, respectively, to the positive P7 and negative P8 terminals of a capacitor or, alternatively, to a capacitor bank disposed in parallel 11, configured adequately in order to meet the needs and objectives proposed herein.

The capacitor (or capacitors) 11 accumulates enough energy to keep the voltage above the primary power voltage 3 due to the increase in voltage coming from the rotor 6 turning inside the coil 2. This characteristic allows it to work as a second independent and DC power source that feeds a second pulse, inverse to the first one, and/or other pulses in other coils coiled around the same rotor 6. This process is denominated as "capacitive discharge feedback" and constitutes the turbo-electromagnetic system described hereinbefore.

The positive pole P7 of the capacitor 11 is connected to the opposite polarity terminal, i.e., the negative terminal T2 of the coil 2 through a third Ch2 switch, identical to the Ch1 4 switch of the first circuit. The capacitor's negative pole P8 is connected, on its turn, through a fourth Ch2' switch that is synchronized with Ch2, to the positive terminal T1 of the coil.

This Ch2' switch shall be switched instantly in order to be always closed when the Ch2 switch is closed and the other switches Ch1 4 and Ch1' of the other circuit are opened, and it shall always be opened when Ch2 switch is opened and the other switches Ch1 4 and Ch1' of the other circuit are closed. In other words, the primary and secondary circuits switch status work inversely, when one circuit is opened, the other should be always closed.

The closing and opening of the Ch1 4 and Ch2 switches are excluding, i.e., both should never be closed or opened at the same time during the motor functioning.

The closing and opening of Ch1' and Ch2' switches are synchronized with the closing and opening of Ch1 4 and Ch2 switches respectively. Always when Ch1 4 is opened, Ch1' will be opened and always when Ch1 4 is closed, Ch1' will be closed. The same is valid for Ch2', always when Ch2 is opened, Ch2' will be opened and always when Ch2 is closed, Ch2' will be closed.

The closing moment of the main excluding switches Ch1 4 and Ch2 is defined by the passage of the referred actuator magnet 8 fixed in the turning shaft 5 of the rotor 6. Thus, one can obtain two pulses, one directly from the power source 3 of the primary circuit and another inverse coming from the secondary circuit capacitor 11. As a result, the switches Ch1 4 and Ch2 shall be positioned with a discrepancy of 180 degrees one from another, in such a way that when the actuator magnet 8 passes by the switch Ch1 4, due to the turning of the shaft 5 and closes together with the switch Ch1', the synchronized switches of the second circuit Ch2 and Ch2' are opened, blocking the passage of current through the secondary circuit. After half a cycle of rotor 6, the switch Ch2 closes together with the switch Ch2', and the switches Ch1 and Ch1' are opened, in such a way that this cycle repeats itself indefinitely.

This synchronicity of closing and opening of the pair of switches Ch1 4 and Ch1' and the pair of switches Ch2 and Ch2' guarantees that at each half a cycle of rotor 6 turn, the direction of the magnetic flow lines of the coil of the stator 1 alternates 180 degrees due to the positive/negative polarity change of terminals T1 and T2 of the coil 2 and contributes to the turn of rotor 6.

When the terminal T1 of coil 2 is positive and T2 is negative, the pulse is called "direct pulse", since the primary circuit is closed and the secondary circuit is opened. After half a cycle of rotor 6, the switches commute and terminal T1 becomes negative and T2 positive. In this latter case, the pulse is called "inverse pulse", since the primary circuit is opened and the secondary circuit is closed allowing the motor's feedback.

In a more advantageous way, the rotor used in the motor object of the present invention comprises a sole compact piece manufactured from a neodymium magnet with a magnetization degree varying between N24 to N54. However, it becomes clear that the above-mentioned rotor can also be manufactured from other materials such as for example ceramic ferrite, or those that use rare earth elements as raw material such as neodymium, samarium-cobalt, praseodymium, cerium, etc.

Figure 6:
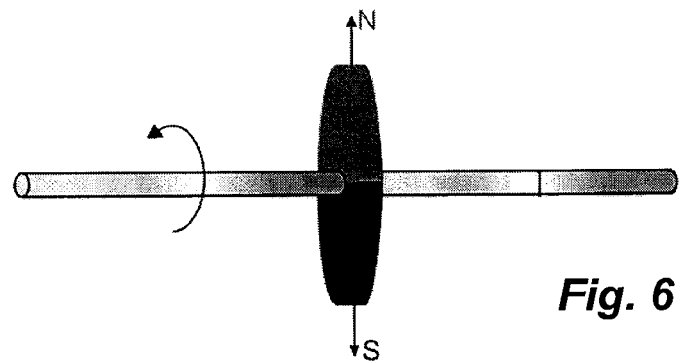
FIG. 6 illustrates a preferred rotor construction, according to the present invention.

Also, preferably but not as a limitation to the present invention, the above-mentioned rotor comprises a sole and compact disc shape with a hole in the center, that is magnetized radially such as illustrated in FIG. 6.

However, it should be clear that this discoid aspect of the rotor is only preferable and do not discard other geometries and magnet configurations such as compacted cylindrical magnets with a hole in the middle and magnetized axially, stacked cylinder magnets, conic, ovoid and even spherical, the last ones being the most efficient ones, but, presently reveal complexity and high manufacture costs.

Figure 7A:
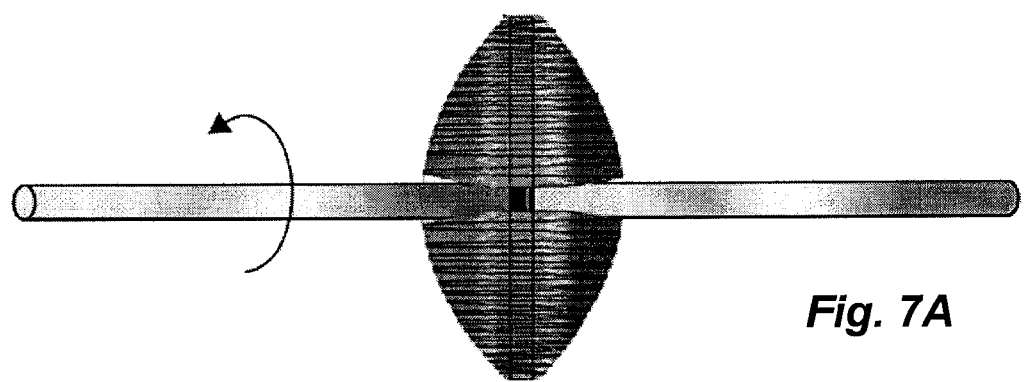
FIGS. 7A and 7B illustrates a preferred construction of the primary motor coil, according the present invention.
Figure 7B:
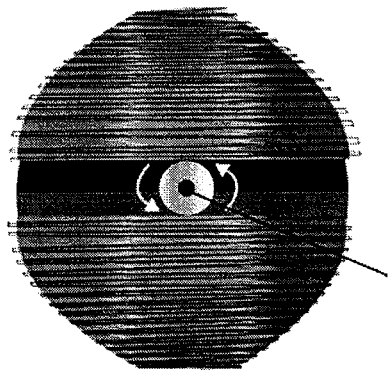

Additionally, as illustrated in FIGS. 7A and 7B, in order to increase the motor efficiency and capacity of the present invention, the coil that involves the radially magnetized neodymium discoid comprises an asymmetric format with a topology similar to a cone trunks, constituted by enameled or covered copper or aluminum wire, of any gauge, projected to work with tensions that vary from 9 to 12 volts, passing by the domestic voltages of 127 and 220 volts or superior up to industrial voltages.

Similarly, it is worth to highlight the fact that the coil topology is also only preferable and does not discard the possibility of using coils with a symmetric cylindrical or annular topology, that are normally used in many applications known in the art.

More specifically, FIGS. 8A, 8B, 8C, 8D and 8E depict alternative embodiments for the electromagnetic motor of the present invention, all of them with the purpose of achieving better efficiency and consequently work capacity. In these assemblies it is possible to noticed that the disposition of the coils is altered to increase the number of pulses that generate voltage peaks and electric current along one cycle of the rotor.

FIG. 8A illustrates an assembly in which coil 2 is comprised of four sectors positioned 90 degrees out of phase, so that two pulses are generated along the rotation cycle of rotor 6. This is called biphasic assembly.

FIG. 8B shows an assembly in which the coil comprises six sectors out of phase with each other, so that the feeding pulses of electric current are applied in three specific points of the rotation cycle of the rotor. In this case the electromagnetic motor is called tri-phase assembly.

FIG. 8C shows a construction in which the coil 2 is divided into eight out-of-phase sectors, which requires four pulsation points along the rotation cycle of the rotor, being called tetra-phase assembly.

These arrangements are more compact, and their configurations take advantage of more pulses (direct and inverse pulse—in both coil directions) along the same cycle of the rotor, which speeds up the rotor and stabilizes torque when heavier loads are applied to the shaft.

The FIGS. 8D and 8E illustrate a coil configuration that is especially advantageous, in which the coil in the primary circuit holds an asymmetric format similar to the cone trunk. In the secondary circuit, the coil holds a similar format, even though it overlaps the spirals with a discrepancy of 90 degrees in relation to the first one forming a kind of beehive.

As a practical example of the advantages and technical effects given by the electromagnetic motor according to the present invention when compared to the conventional motors known in the state of the art, it is possible to use any electrical receptor like a domestic fan, for example.

A typical and regular medium size domestic fan found in the market today is manufactured to consume around 120 W of energy (P). The voltage (U) of the public power grid used for such devices is usually 127V (or 220V). Let's consider it 120V for easy calculation. Therefore, according to basic electrical theories, the electric current (i) flowing through the motor of this fan is 1 A (let's consider this conventional motor's power factor=1), because:

$$I=P/U=120 \ W/120V=1 \ A$$

In other words, this electric appliance requires 1 Ampere of electric current to produce the power of 120 W, which rotates the fan at a determined speed.

When this motor of the prior art was actually replaced by one equivalent electromagnetic motor of the present invention, it was possible to obtain the same mechanical work (i.e., the fan blade rotating at the same speed) with two 12V batteries in series (24V total voltage) and only 0.5 Amp flowing through the motor of the fan. Therefore, the power required by the motor of the fan to produce the same mechanical work is:

$$P=U \times I=24 \times 0.5=12 \ W$$

The comparison between the two fans, one with the conventional motor of the state of the art and the other with the electromagnetic motor of the present invention, revealed that this latter is about ten times more efficient (consumed 10 times less energy) than the motor of the current prior art, due to the fact that the electromagnetic motor of the present invention is able to harness the back energy captured by the voltage peaks together with the collapse of the magnetic field trapped inside the coil, when the electric power supply is turned on and off at precise positions, as mentioned hereinbefore.

Alternatively, the rotation shaft of the present electromagnetic motor can be attached to a mechanism that, through the mechanical torque generated by the motor, works as a power generator. In addition, the present adaptation can be attached to, or even replace generators ran on primary sources of energy.

Although the present invention is described in relation to the motors used in devices called electric receptors, it is still possible to wind a second coil around the first coil, so that the second coil captures the back energy or back voltage by induction. Through the adaptation of a filament equivalent to a diode, in such a way to be opposed to the back energy flow, it is possible to generate a resistance, which will be heat the said filament, such as happened in the water heater.

Therefore, the electromagnetic motor, object of the present invention would be work as an heater device, which obtain heat through Joule effect, without consuming the energy from the primary source, since the consumed energy for heat is provided by the back voltage peaks.

Thus, in regard to all of what has been exposed hereinbefore, it is clear that the electromagnetic motor, object of the present invention, can obtain a substantial energy gain, due to voltage peaks and magnetic field collapses, as well as considerable reduction of losses, considered intrinsic to the motors of the current prior art. Besides, in its alternative construction a circuit with feedback properties promoting a yet superior reduction of energy consumption and increase in the motor performance is obtained.

The invention claimed is:

1. An ELECTROMAGNETIC MOTOR, comprising: at least one stator constituted by at least one coil formed by conducting wires including a first terminal and a second terminal that are respectively connected to a positive pole and a negative pole of a power source, being that between the second terminal and the negative pole there is an on/off switch properly positioned close to a shaft of a rotor, and including an actuator of the on/off switch placed in the end of the said shaft, being that the at least one coil captures a bidirectional magnetic field, respectively, at the feeding and interruption of the electric current derived from the power source.

2. The ELECTROMAGNETIC MOTOR according to claim 1, wherein the collapse of the magnetic field generated by the power source takes place together with a back voltage peak with an inverted polarity to that of the magnetic field.

3. The ELECTROMAGNETIC MOTOR, according to claim 1, wherein the at least one coil is constituted by the windings of a conducting wire in two sectors with preferably the same number of turns and axially positioned out of phase to each other.

4. The ELECTROMAGNETIC MOTOR, according to claim 1, wherein the power source supplies DC current.

5. The ELECTROMAGNETIC MOTOR, according to claim 1, wherein the power source is a battery or rectified AC power source.

6. The ELECTROMAGNETIC MOTOR, according to claim 1, wherein the actuator is a permanent magnet whose magnetic field is perpendicular to the shaft of the rotor.

7. The ELECTROMAGNETIC MOTOR, according to claim 1, wherein the on/off switch is a magnetic switch like a reed switch, or an optic sensor, a Hall sensor or a pulsating PWM circuit.

8. The ELECTROMAGNETIC MOTOR, according to claim 1, further including: a electromagnet constituted of laminated silicon steel core enveloped in a number of turns of conducting wire, disposed outside of the stator and perpendicular positioned to the shaft.

9. The ELECTROMAGNETIC MOTOR, according to claim 1, further including a power generator mechanism attached to the end of the rotor shaft.

10. The ELECTROMAGNETIC MOTOR, according to claim 1, further including having a secondary feedback circuit constituted by another switch, disposed between the positive pole of said power source and the first terminal, that is connected to a rectifying bridge provided with a third terminal, a fourth terminal, a fifth terminal, and a sixth terminal that are respectively connected to a seventh terminal and an eighth terminal of at least one capacitor and to the first terminal and the second terminal; the capacitor being connected, yet, to a second switch and to a third switch that are synchronized.

11. The ELECTROMAGNETIC MOTOR, according to claim 10, wherein the another switch is synchronized with the switch on/off.

12. The ELECTROMAGNETIC MOTOR, according to claim 10, wherein the third switch is synchronized with the second switch.

13. The ELECTROMAGNETIC MOTOR, according to claim 10, wherein the second switch is disposed with a discrepancy of 180 degrees of the on/off switch.

14. The ELECTROMAGNETIC MOTOR, according to claim 10, wherein the capacitor is constituted by a sole capacitor or by a bank of capacitors connected in parallel.

15. The ELECTROMAGNETIC MOTOR, according to claim 1, wherein the rotor comprises a sole piece compacted manufactured from neodymium magnet, ceramic ferrite or AlNiCo magnet or any other magnet derived from rare earth elements such as samarium, praseodymium, cerium.

16. The ELECTROMAGNETIC MOTOR, according to claims 1, wherein the rotor comprises a compact type geometrical format of a plurality of magnets with centered holes and radially magnetized, cylindrical, stacked and axially magnetized, piled tablets, conical, ovoid, spherical or discoid.

17. The ELECTROMAGNETIC MOTOR, according to claim 16, wherein said rotor comprises a radially magnetized compact disk shape.

18. The ELECTROMAGNETIC MOTOR, according to claim 1, wherein the coil topology is asymmetrical.

19. The ELECTROMAGNETIC MOTOR, according to claim 18, wherein the coil holds a topology similar to a cone trunk, constituted by enameled or covered aluminum or copper wire.

20. The ELECTROMAGNETIC MOTOR, according to claim 1, wherein the coil is constituted by four sectors with a axially and perpendicularly discrepancy.

21. The ELECTROMAGNETIC MOTOR, according to claim 1, wherein the coil is constituted by six sectors with a discrepancy among them.

22. The ELECTROMAGNETIC MOTOR, according to claim 1, wherein the coil is constituted by eight sectors with a discrepancy among them.

23. A WORK TORQUE GENERATOR EQUIPMENT, comprising:
   at least one electromagnetic motor according to any one of claims 1 to 22.

* * * * *

UNITED STATES PATENT AND TRADEMARK OFFICE
CERTIFICATE OF CORRECTION

| | |
|---|---|
| PATENT NO. | : 8,546,985 B2 |
| APPLICATION NO. | : 12/992251 |
| DATED | : October 1, 2013 |
| INVENTOR(S) | : Keppe et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 376 days.

Signed and Sealed this
Twenty-first Day of July, 2015

Michelle K. Lee
*Director of the United States Patent and Trademark Office*